United States Patent
Straathof et al.

(10) Patent No.: US 10,759,719 B2
(45) Date of Patent: Sep. 1, 2020

(54) PROPELLANT CHARGE OR GRAIN WITH PRINTED ENERGETIC MATERIAL LAYERS

(71) Applicant: Nederlandse Organisatie voor toegepast—natuurwetenschappelijk onderzoek TNO, s-Gravenhage (NL)

(72) Inventors: Michiel Hannes Straathof, Delft (NL); Christoffel Adrianus Van Driel, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/087,490

(22) PCT Filed: Mar. 22, 2017

(86) PCT No.: PCT/NL2017/050175
§ 371 (c)(1),
(2) Date: Sep. 21, 2018

(87) PCT Pub. No.: WO2017/164732
PCT Pub. Date: Sep. 28, 2017

(65) Prior Publication Data
US 2019/0100474 A1 Apr. 4, 2019

(30) Foreign Application Priority Data
Mar. 22, 2016 (EP) .................. 16161643

(51) Int. Cl.
| | |
|---|---|
| C06B 45/00 | (2006.01) |
| C06B 45/12 | (2006.01) |
| B33Y 80/00 | (2015.01) |
| F42B 5/16 | (2006.01) |
| C06B 45/10 | (2006.01) |

(52) U.S. Cl.
CPC .............. *C06B 45/12* (2013.01); *B33Y 80/00* (2014.12); *C06B 45/00* (2013.01); *C06B 45/105* (2013.01); *F42B 5/16* (2013.01)

(58) Field of Classification Search
CPC ....... C06B 45/00; C06B 45/12; C06B 45/105; C06B 21/0075; F42B 5/16; A61J 3/07
USPC ................. 102/286, 287, 202; 149/2; 86/1.1; 264/3.6
See application file for complete search history.

(56) References Cited

U.S. PATENT DOCUMENTS

| | | | |
|---|---|---|---|
| 2,339,114 A | 1/1944 | Scherer | |
| 3,073,242 A | 1/1963 | Hewson | |
| 3,166,612 A | 1/1965 | Sauer et al. | |
| 3,194,851 A * | 7/1965 | Sauer | F42B 5/16 |
| | | | 264/3.6 |
| 3,811,358 A | 5/1974 | Morse | |

(Continued)

FOREIGN PATENT DOCUMENTS

| | | |
|---|---|---|
| WO | WO-2015/021545 | 2/2015 |
| WO | WO-2015/035457 | 3/2015 |

OTHER PUBLICATIONS

International Search Report and Written Opinion for PCT/NL2017/050175, dated Jun. 16, 2017, 10 pages.

*Primary Examiner* — Michael D David
(74) *Attorney, Agent, or Firm* — Morrison & Foerster LLP (57) ABSTRACT

Propellant charges or grains having printed layers of two or more energetic materials are described along with methods for preparing and using them.

18 Claims, 5 Drawing Sheets

(56) References Cited

U.S. PATENT DOCUMENTS

| | | |
|---|---|---|
| 4,386,569 A | 6/1983 | Deas |
| 5,714,711 A | 2/1998 | Schumacher et al. |
| 7,955,453 B1 | 6/2011 | Kelley et al. |
| 10,196,323 B2 * | 2/2019 | Warrender ............ C06B 23/007 |

* cited by examiner

PROPELLANT CHARGE OR GRAIN WITH PRINTED ENERGETIC MATERIAL LAYERS

CROSS-REFERENCE TO RELATED APPLICATIONS

This application is the national phase of PCT application PCT/NL2017/050175 having an international filing date of 22 Mar. 2017, which claims benefit of European patent application No. 16161643.8 filed 22 Mar. 2016. The contents of the above patent applications are incorporated by reference herein in their entirety.

The invention is directed to a propellant charge, to a method of preparing a propellant charge, and to uses of the propellant charge.

Propellant charges are used in pyrotechnics and ballistics in order to accelerate a piston or a projectile. Typically, the propellant charge is ignited by a primer, which is a small amount of sensitive explosive. Gases produced by combustion of the propellant charge cause a rapid build-up of pressure. When a certain pressure is reached, the projectile begins to move, thereby causing an increase in chamber volume. After a pressure maximum is reached, typically the pressure decreases relatively rapidly due to the expansion of the chamber volume.

A propellant charge is an amount of relatively insensitive but powerful energetic material that propels the projectile out of the gun barrel. Various types of propellant charges having different composition and geometries are used for different applications and purposes.

The propellants used are typically solid. Examples of propellants that are in use today include gun powders, including smokeless powders. Smokeless powders may be considered to be classed as either single or multi-base powders. Conventional smokeless powders consist mainly of nitrocellulose. Typical production processes include drying of water-wet nitrocellulose, mixing and kneading with ether and alcohol and other constituents, pressing the propellant dough through a die, cutting the obtained strand into propellant grains, and drying these grains. Although called powders, they are not in powder form, but in granule form.

In single-base propellants, nitrocellulose is the main energetic material present. Other ingredients and additives are added to obtain suitable form, desired burning characteristics, and stability.

The multi-base propellants may be divided into double-base and triple-base propellants, both of which contain typically nitroglycerin to facilitate the dissolving of the nitrocellulose and enhance its energetic qualities. The nitroglycerin also increases the sensitivity, the flame temperature, burn rate, and tendency to detonate. The higher flame temperature serves to decrease the smoke and residue, but increases flash and gun-tube erosion.

Triple-base propellants are double-base propellants with the addition of nitroguanidine to lower the flame temperature, which produces less tube erosion and flash. The major drawback is the limited supply of the raw material nitroguanidine.

In the multi-base propellants, the multiple ingredients are evenly distributed in the propellant charge and in the material of each grain.

Once ignition is achieved, it is desirable to have the propellant burn in a controlled manner from the surface of the propellant charge inwardly. As the propellant is initially ignited and gases are being generated, the projectile is either at rest or moving relatively slowly. Thus, gases are being generated faster than the volume of the chamber is increasing. As a result of this, the pressure experienced increases. As the projectile accelerates, the volume of the chamber increases at a rate which ultimately surpasses the rate of gas generation by the burning of the propellant material. The transition corresponds to the point of maximum pressure in the combustion chamber. Thereafter the pressure decreases as the projectile continues to accelerate thus increasing the volume of the chamber at a rate faster than the increase in volume of gases being generated by the propellant burn.

Solid propellants are designed to produce a large volume of gases at a controlled rate. Gun barrels and some rocket casings are designed to withstand a fixed maximum gas pressure. The pressure generated can be limited to this maximum value by controlling the rate of burning of the propellant. In the art, the burn rate is controlled by varying the following factors:

(1) the size and shape of the grain, including perforations,
(2) the web thickness or amount of solid propellant between burning surfaces; the thicker the web, the longer the burning time,
(3) the linear burn rate, which depends on the gas pressure and the chemical composition of the propellant, including volatile materials, inert matter, and moisture present.

When a propellant burns in a confined space, the rate of burning increases as both temperature and pressure rise. Since propellants burn only on exposed surfaces, the rate of gas evolution or changes in pressure will also depend upon the area of propellant surface ignited.

The use of perforations in a propellant charge so as to control the rate of burning is for instance known from U.S. Pat. No. 4,386,569. This patent is based on the insight that the burn rate of the propellant material, i.e. the burn characteristics of the propellant charge, not only depends on the physical and chemical characteristics of the propellant material itself, but also depends on the shape of the propellant charge. U.S. Pat. No. 4,386,569 accordingly describes a propellant grain of generally cylindrical shape having a plurality of longitudinal substantially parallel perforations extending there through, the cross-sectional locations of said perforations being such that the interstitial distances between adjacent perforations is substantially equal and substantially equals the extrastitial distances between the perimetric perforations and the outer surface of the grain wall.

U.S. Pat. No. 5,524,544 describes a propellant charge with a deterred burn rate. Most conventional propellants have a high burn rate, whereas immediately after ignition it is more desirable to have a lower burn rate. The conventional way of creating a lower burn rate exterior and a higher burn rate interior is by impregnating with a non-energetic plasticiser. This has, however, the disadvantage that during the life span of the grain, the non-energetic plasticiser can migrate and thereby mitigate the effect. U.S. Pat. No. 5,524,544 describes a possible solution for this migration by impregnating a propellant charge with a cellulosic thermoplastic deterrent. The resulting propellant particulate has an exterior portion with a cellulosic thermoplastic deterrent gradationally dispersed therein. The deterrent itself is not an energetic material as defined in this application.

Also U.S. Pat. No. 3,706,278 seeks to reduce the initial burn rate of the propellant charge so as to impart a burn rate gradient to produce a high projectile velocity while preventing unduly high chamber pressures. In this patent disclosure the gas generation schedule of propellant charges is regulated by providing individual propellant charges with a polymeric film, or layer or coating. The polymeric coatings do not comprise energetic materials as defined in this application.

U.S. Pat. Nos. 3,166,612 and 3,194,851 describe multi-layer propellants containing a cores which has burning characteristics different from the burning characteristics of the surrounding layers. These propellants do not have any perforations.

With the conventional preparation methods (such as extrusion), only charges of limited geometries heretofore could be economically manufactured. Consequently, the number of variables that could be manipulated to achieve a given specified performance was limited. It would be desirable to find improved preparation methods that allow further variables to be manipulated in order to create a prolonged maximum pressure.

Object of the present invention is to overcome one or more of the disadvantages of the prior art.

The inventors found that this objective can, at least in part, be met by a propellant charge wherein a gradient of energetic materials is applied in multiple directions. The inventors further found that propellant charges can be suitably manufactured with remarkable degrees of freedom using additive manufacturing processes.

Accordingly, in a first aspect the invention is directed to a propellant charge or grain, comprising two or more energetic materials with different linear burn rate, wherein the two or more energetic materials are distributed within the charge or grain such that two perpendicular cross-sections of said propellant charge or grain each have at least two linear burn rate gradients in non-parallel directions,
wherein said propellant charge or grain is layered with layers having a layer thickness in the range of 1-10 000 µm, preferably 10-5000 µm, such as 50-2000 µm, 100-1000 µm, or 200-800 µm,
wherein, if the propellant charge or grain has a longitudinal axis, at least one of said perpendicular cross-sections is along said longitudinal axis, and wherein said propellant charge or grain further comprises one or more perforations.

The term "energetic materials" as used in this application is meant to refer to any substance or mixture of substances that, through chemical reaction, is capable of rapidly releasing energy. In the context of this application, an energetic component comprises fuel and oxidiser. Typically, energetic materials are solid, liquid or gaseous substances or mixtures which are capable of very fast chemical reactions without the use of additional reactive species (e.g. oxygen). The reaction can be initiated by means of mechanical, thermal or shock wave stimuli. Generally the reaction products are gaseous. Energetic components can be applied in explosives, rocket and gun propellants, pyrotechnics, gas generators etc. The energetic components of the present invention are distinguished from solid propellants used in hybrid rockets, which are only capable of a chemical reaction once they are brought into contact with the additional liquid (or gas) propellant that is initially kept separate from the solid propellant. Such propellants for hybrid rockets are, for instance, known from US-A-2009/0 217 525 and US-A-2013/0 042 596.

The term "energetic binder" as used in this application is meant to refer to a binder material that additionally is capable of rapidly releasing energy.

The term "burn rate" as used in this application is meant to refer to the rate at which a propellant charge releases gas during combustion. The burn rate is commonly measured as the mass of pyrotechnic composition consumed per unit time, e.g., g/s. The term "linear burn rate" as used in this application on the other hand is meant to refer to the distance the burning surface of a pyrotechnic composition advances inwardly (perpendicular to the burning surface) per unit time. The linear burn rate is commonly reported as distance per unit time, e.g., mm/s.

The term "layered" as used in this application is meant to refer to a product that comprises two or more distinct identifiable layers in the same product having different properties, in particular different linear burn rate. A layered product as defined herein is distinguished from e.g. a product which is impregnated. Impregnation of a material does not lead to two or more distinct identifiable layers. Preferably, the two or more distinct identifiable layers are obtained by a layered additive manufacturing process. This can be any process which results in a three-dimensional article that includes a step of sequentially forming the shape of the article one layer at a time.

The term "additive manufacturing" as used in this application is meant to refer to a method of making a three-dimensional solid object from a digital model. Additive manufacturing is achieved using an additive process, where successive layers of material are laid down in different shapes. Additive manufacturing is sometimes known as "3D printing", or "additive layer manufacturing" (ALM). More in particular, additive manufacturing is a group of processes characterised by manufacturing three-dimensional components by building up substantially two-dimensional layers (or slices) on a layer by layer basis. Each layer is generally very thin (for example between 20-100 µm) and many layers are formed in a sequence with the two-dimensional shape varying on each layer to provide the desired final three-dimensional profile. In contrast to traditional "subtractive" manufacturing processes where material is removed to form a desired component profile, additive manufacturing processes progressively add material to form a net shape or near net shape final component.

Advantageously, the invention allows to better regulate the burning of the propellant charge or grain so as to prolong the period of maximum pressure at which the projectile is accelerated. As a result of the prolonged period of maximum pressure, the projectile will be given a higher velocity.

The propellant charge or grain is layered. This may be achieved by additive manufacturing techniques and distinguishes the propellant charge or grain of the invention from charges or grains that are impregnated. While impregnation can lead to a certain burn rate distribution it does not yield a layered propellant charge or grain. The different print layers of an additive manufacturing process are identifiable in the end product, for example, by microscopic techniques.

One can distinguish print layers of the propellant charge or grain of the invention from functional layers of the propellant charge or grain. Print layers are the individual layers by which the propellant charge or grain is manufactured in the additive manufacturing technique. A product being manufactured by an additive manufacturing technique is recognisable as such under a microscope. When examined under a microscope, the individual print layers are recognisable in the product thereby revealing the manufacturing method. Such layered products (wherein the print layers are recognisable under a microscope) are thus distinguished from products manufactured by other techniques, such as extrusion or liquid immersion. The different print layers can typically have an individual layer thickness in the range of 1-10 000 µm, preferably 10-5000 µm, such as 50-2000 µm, 100-1000 µm, or 200-800 µm. Functional layers are layers in the propellant charge or grain that are distinguished from each other in functional properties, such as a different linear burn rate. The functional layers can typically have an individual layer thickness in the range of 100-50 000 µm, preferably 200-30 000 µm, such as 500-20 000 µm, 1000-10 000 µm, or 2000-5000 µm. The propellant charge or grain of the invention is layered with layers having a layer thickness in the range of 1-10 000 µm. This suitably refers to print layers. Hence, the propellant charge or grain suitably comprises two or more print layers, each having a layer thickness in the range of 1-10 000 µm, preferably 10-5000 µm, such as 50-2000 µm, 100-1000 µm, or 200-800 µm.

Preferably, the two or more energetic materials having different linear burn rate are present in different functional layers in the propellant charge or grain of the invention. The propellant charge or grain may, for instance, comprise a core and one or more separate functional layers, such as 2-10 functional layers, 2-8 functional layers, or 2-6 functional layers, wherein two or more of said functional layers are distinguished from each other in one or more functional properties. Some of the layers may comprise energetic materials, whereas others may be free from energetic materials.

In accordance with the invention, the propellant charge or grain comprises two or more energetic materials with different linear burn rate. Many different energetic materials are known in the art, such as disclosed in J. Akhaven, *The Chemistry of Explosives*, The Royal Society of Chemistry, 2004, ISBN 0-85404-640-2 and J. P. Agrawal, *High Energy Materials—Propellants, Explosives and Pyrotechnics*, WILEY-VCH Verlag GmbH & Co, Weinheim, 2010, ISBN 978-3-527-32610-5, the disclosures of which are herewith completely incorporated by reference. Some examples include 2,4,6-trinitrotoluene (TNT), cyclo-1,3,5-trimethylene-2,4,6-trinitramine (RDX), cyclotetramethylenetetranitramine (HMX), pentaerythrol tetranitrate (PETN), 3-nitro-1,2,4-triazol-5-one (NTO), nitroglycerine (NG), nitrocellulose (13% N) (NC), ammonium nitrate (AN), ammonium perchlorate (AP), 2,4,6,8,10,12-(hexanitrohexaaza)tetracyclododecane (CL20 or HNIW), 1,3,3-trinitroazetidine (TNAZ), octanitrocubane (ONC), 1,1-cliamino-2,2-dinitroethene (FOX-7), and ammonium dinitramide (ADN). The propellant charge or grain of the invention may comprise two or more of these energetic materials or mixtures thereof.

When this application refers to two or more energetic materials having different linear burn rate, this does not necessarily mean that the energetic materials must be chemically different. There can also be a difference in physical properties of the energetic materials that leads to a difference in linear burn rate. It is, for instance, also possible that the two or more energetic materials differ in average particle size, as long as this results in a difference in linear burn rate of the energetic materials.

The propellant charge or grain comprises two or more energetic materials with different linear burn rate, such as 2-10, 2-8 or 2-6 energetic materials with different linear burn rate. Suitably, the propellant charge or grain can comprise three or more energetic materials with different linear burn rate, such as 3-10, 3-8, or 3-6 energetic materials with different linear burn rate.

The total amount of energetic material in the propellant charge or grain may vary, but is typically more than 30% by total weight of the propellant charge or grain, such as 40-95%, or 45-90%.

The two or more energetic materials with different linear burn rate are distributed within the charge or grain such that two perpendicular cross-sections of said propellant charge or grain each have at least two linear burn rate gradients in non-parallel directions. If the propellant charge or grain has a longitudinal axis, at least one of said perpendicular cross-sections is along said longitudinal axis. A linear burn rate gradient in accordance with this invention is typically a gradient that consists of a number of individual increments. These increments are the result of the layered structure of the propellant charge or grain. The layered structures of the propellant charge or grain do not allow a completely smooth gradient. Nonetheless, by using multiple small increments a more gradual transition can be achieved. In the context of this invention the use of two layers both having a different linear burn rate, is already considered to result in a linear burn rate gradient.

Figure 1A:
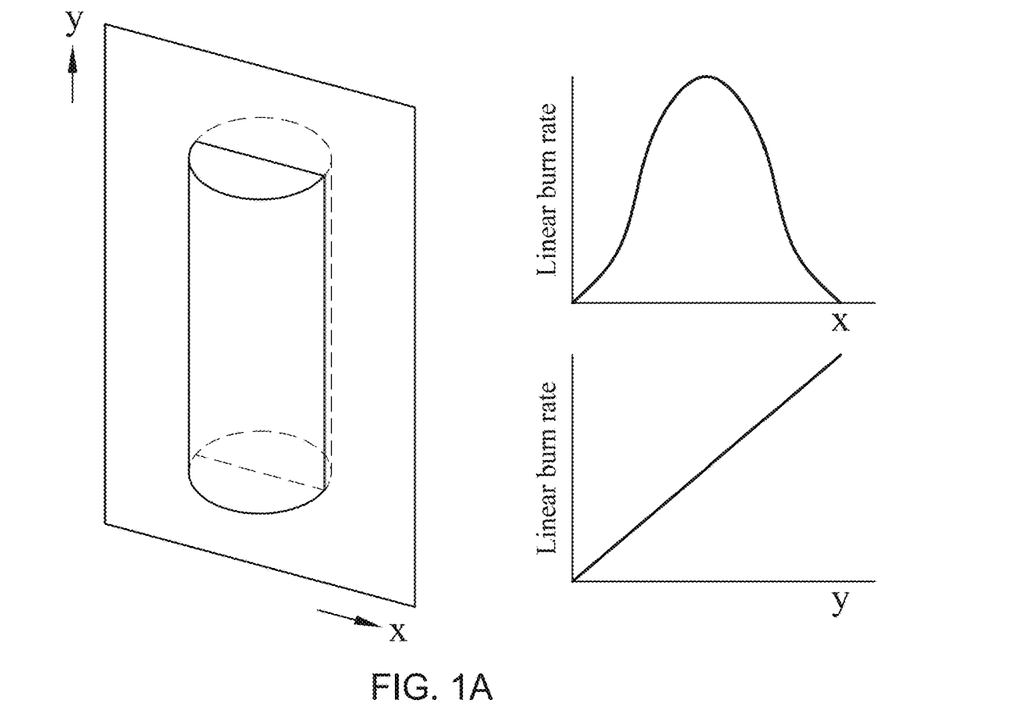
FIG. 1A illustrates a schematic example in which one of the linear burn rate gradients is a radial gradient giving rise to a gradient on the x-axis, and the other linear burn rate can be a gradient on the y-axis.
Figure 1B:
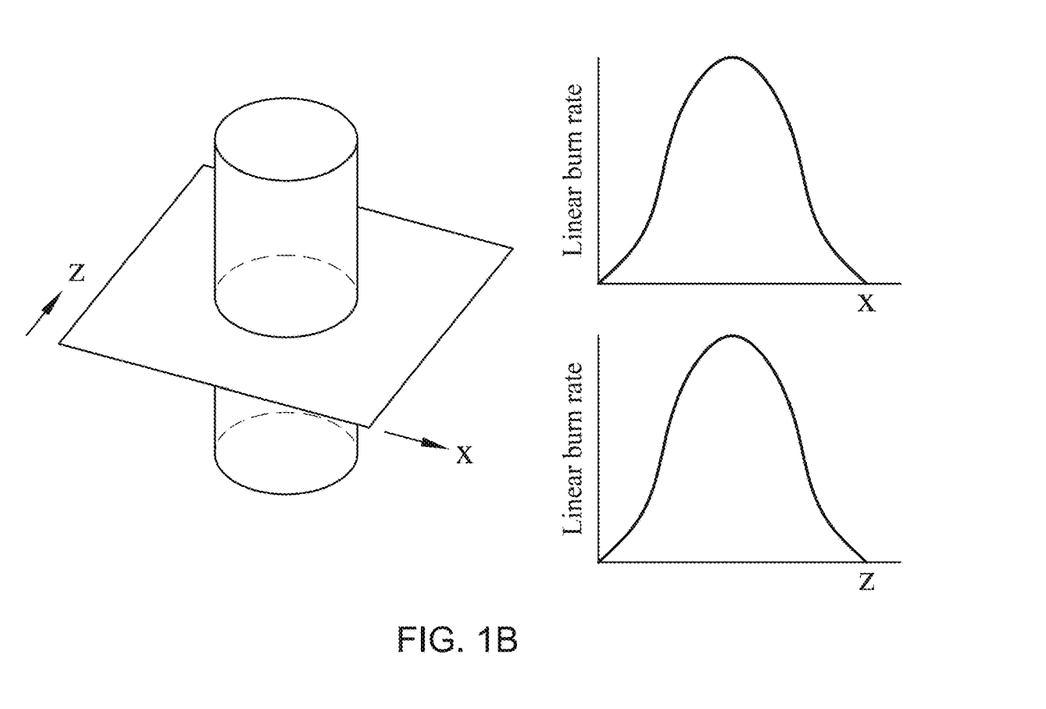
FIG. 1B illustrates a schematic example in which a radial gradient gives rise to a gradient on the x-axis and the z-axis.

This may be illustrated, for example, with a cylindrical shape, as shown in FIG. 1. Since the cylindrical shape has a longitudinal axis, at least one of the cross-sections runs along the longitudinal axis of the cylinder. This rectangular cross-section must have at least two linear burn rate gradients in non-parallel directions. In the schematic example of FIG. 1A, one of the linear burn rate gradients is a radial gradient giving rise to a gradient on the x-axis, and the other linear burn rate can be a gradient on the y-axis. The linear burn rate at the proximal end (herein defined as the end closest to the point of ignition) may thus be lower than the linear burn rate at the distal end (herein defined as the end most removed from the point of ignition). Perpendicular to the rectangular cross-section is a circular cross section. Also this cross-section should have at least two linear burn rate gradients in non-parallel directions. In the schematic example of FIG. 1B, a radial gradient gives rise to a gradient on the x-axis and the z-axis.

Figure 2A:
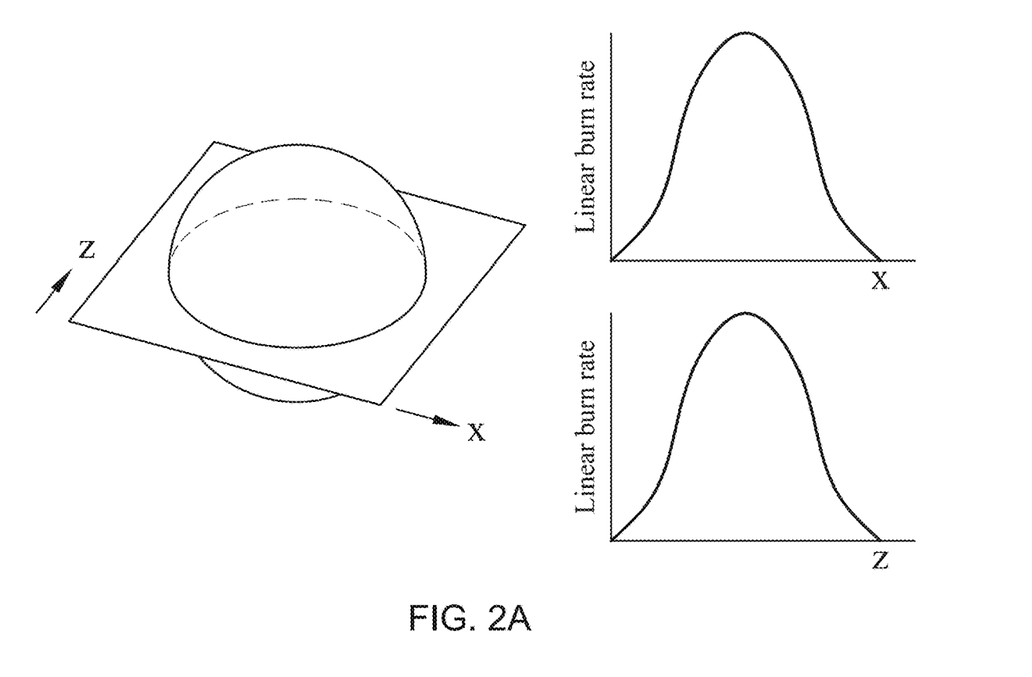
FIG. 2A-B illustrate a schematic example in which the sphere has a radial gradient. This gives rise to a linear burn rate gradient on the x-axis and z-axis in FIG. 2A and, in a cross-section perpendicular thereto, to a linear burn rate gradient on the x-axis and y-axis in FIG. 2B.
Figure 2B:
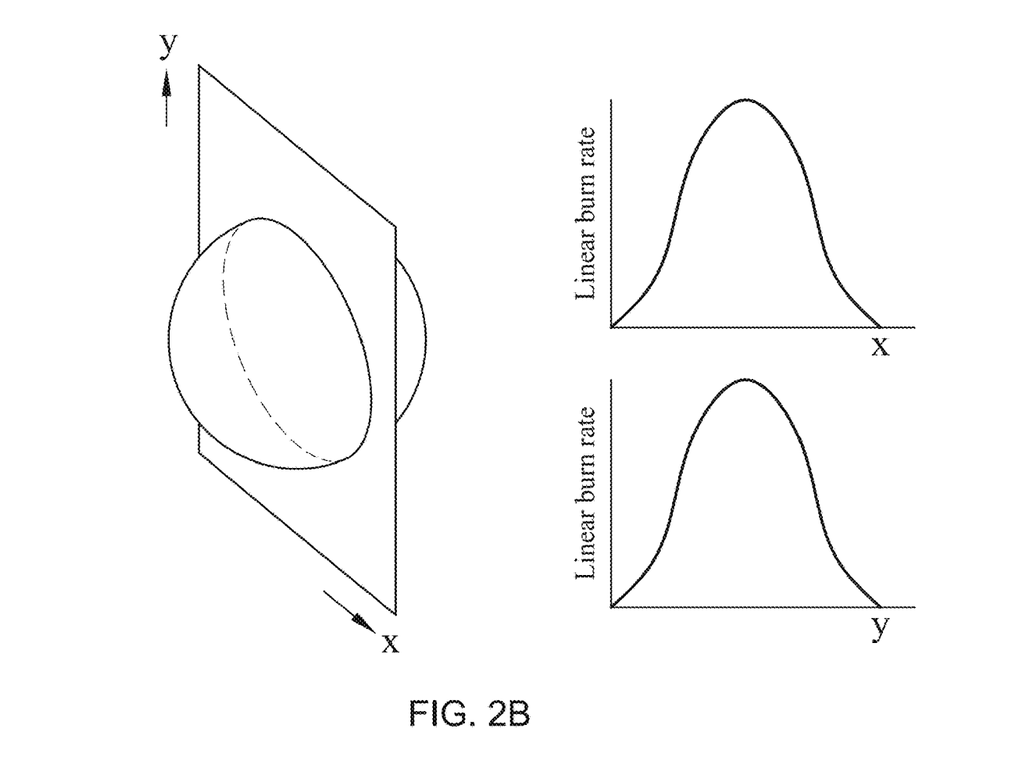

Another schematic example of the invention uses a spherical shape. A first circular cross-section of the sphere must have a linear burn rate gradient in two non-parallel directions. A further circular cross-section, perpendicular to the first circular cross-section, must also have a linear burn rate gradient in two non-parallel directions. In the schematic example of FIG. 2, the sphere has a radial gradient. This gives rise to a linear burn rate gradient on the x-axis and z-axis in FIG. 2A and, in a cross-section perpendicular thereto, to a linear burn rate gradient on the x-axis and y-axis in FIG. 2B.

Figure 3A:
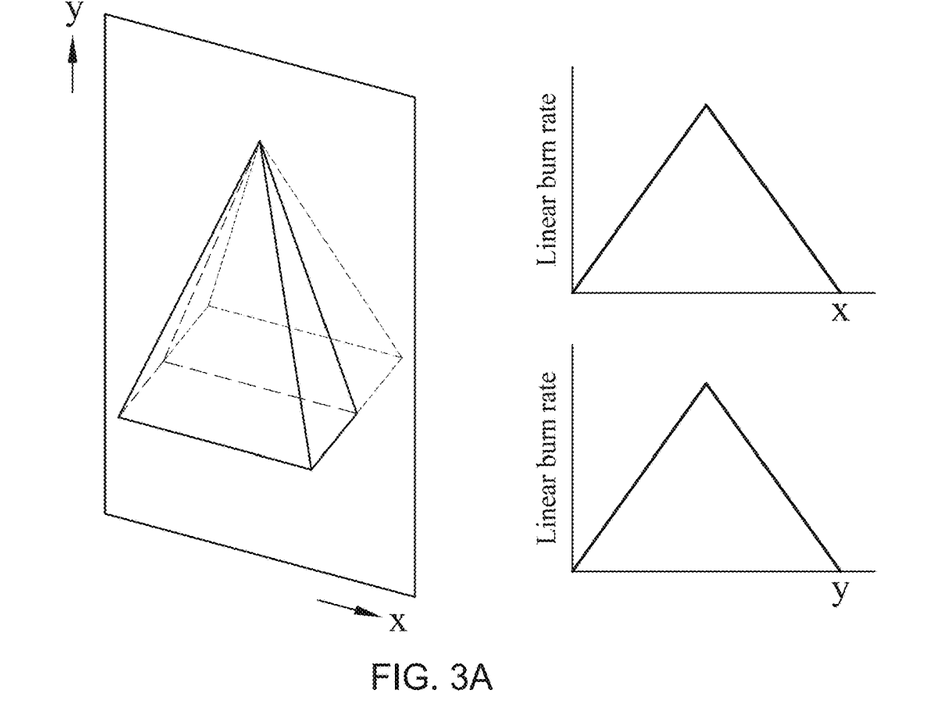
FIG. 3A-B illustrate a schematic example using a square-based pyramid shape.
Figure 3B:
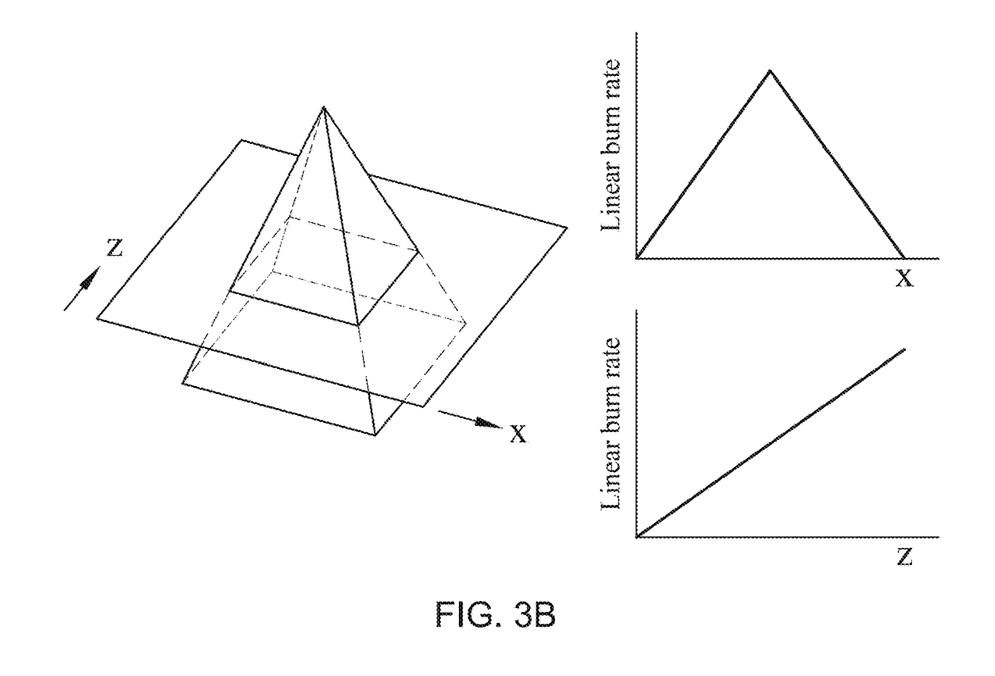

A third schematic exemplary illustration of the invention is shown in FIG. 3 using a square-based pyramid shape. Since the square-based pyramid shape has a longitudinal axis, at least one of the cross-sections runs along the longitudinal axis of the square-based pyramid. This triangular cross-section must have at least two linear burn rate gradients in non-parallel directions. In the schematic example of FIG. 3A, one of the linear burn rate gradients is on the x-axis, and the other linear burn rate gradient is a gradient on the y-axis. Perpendicular to the triangular cross-section is a square cross section. Also this cross-section should have at least two linear burn rate gradients in non-parallel directions. In the schematic example of FIG. 3B, one of the linear burn rate gradients is on the x-axis, and the other linear burn rate gradient is a gradient on the z-axis.

It will be understood that the schematic examples of FIGS. 1-3 solely serve as illustration and that any other geometry may be envisaged. Although in FIGS. 1-3, the gradients are completely smooth, this is purely schematic. In reality the gradients may consist of individual increments.

The propellant charge or grain may suitably have multiple layers with different linear burn rate. For example, the propellant charge or grain may comprise 2-10 layers with different linear burn rate, such as 2-8 layers with different linear burn rate, or 3-8 layers with different linear burn rate.

The propellant charge or grain further comprises one or more perforations. Perforations have been used in the art, but due to the conventional preparation methods these known perforations were only present along the longitudinal axis of the charge or grain. Such known grain designs typically have a 37 perforations, 19 perforations, or 7 perforations arranged in a hexagonal pattern. However, any other number of perforations is also possible. Suitably, the propellant charge or grain is of substantially cylindrical or hexagonal shape having a plurality of longitudinal substantially parallel perforations extending there through. It is advantageous if the cross-sectional locations of the perforations are such that the interstitial distances between adjacent perforations is substantially equal and substantially equals the extrastitial distances between the perimetric perforations and the outer surface of the grain wall. In effect, this results in a structure, wherein the perforations are distributed in the charge or grain such that they form the points of a hexagonal lattice. In accordance with the invention, however, such perforations do not necessarily need to extend substantially parallel through the longitudinal axis of the charge or grain. It is also possible that the perforations form a three-dimensional porous network in the charge or grain, by which the burn rate can further be regulated. The three-dimensional porous network may or may not be interconnected. Additive manufacturing allows the creation of any interconnected network, including so-called programmed splitting sticks propellants. These involve the use of embedded slits which are not initially exposed to hot ignition gases. Normal surface regression during burning, however, exposes the slits, typically after peak pressure has been reached in the gun, leading to a large increase in surface area and a corresponding increase in the mass generation rate.

In accordance with the invention it is preferred that at least one of the linear burn rate gradients is such that the linear burn rate increases from the surface of the burn propellant charge or grain inwards. The surface is any surface that is in direct contact with the environment. The surface includes the surface of any perforations in the propellant charge or grain. Hence, when burning commences, from any exterior surface (including inside the perforations) the linear burn rate increases as propellant is consumed.

It may also be advantageous to have a distribution of the energetic materials with different linear burn rate in the propellant charge or grain which, from the surface of the propellant charge or grain inwards, initially provides a relatively higher linear burn rate, subsequently a relatively lower linear burn rate, and thereafter a relatively higher linear burn rate.

The amount of energetic material may be 30% or more by total weight of the propellant charge or grain, such as 40-95%, or 45-90%. It is possible that ingredients in the propellant charge or grain perform multiple functions. For example, an energetic material can at the same time be a plasticiser or a binder.

In addition to the energetic materials, the propellant charge or grain may further comprise a binder, which binder may or may not be an energetic binder. Suitable non-energetic binders include hydroxy terminated polybutadiene (HTPB), carboxyl terminated polybutadiene (CTPB), hydroxyl terminated polyether (HTPE), polypropylene glycol (PPG), polyphenyl ether (PPE), and hydroxy-terminated caprolactone ether (HTCE). Suitable energetic binders include nitrocellulose, polyvinylnitrate, polynitropolyphenyle, glycidyl azide polymer (GAP), poly(3-azidomethyl 3-methyl oxetane) (polyAMMO), poly(2-nitratomethyloxirane) (polyGLYN), poly(3-nitratomethyl-3-methyloxetane) (polyNIMMO), copolymer of glycidyl azide polymer and poly(bis(azidomethyl)oxetane (GAP-co-poly(BAMO)). Preferably, the propellant charge or grain comprises one or more binders selected from hydroxy terminated polybutadiene, hydroxyl terminated polyether hydroxy-terminated caprolactone ether, nitrocellulose, polyvinylnitrate, and glycidyl azide polymer.

The total amount of binder in the propellant charge or grain can be in the range of 5-45% by total weight of the propellant charge or grain, such as 10-40%, or 15-35%.

Further ingredients that may be present in the propellant charge or grain include plasticisers (energetic or non-energetic), antioxidants, bonding agents, burn rate modifiers, stabilisers. The total amount of these optional further ingredients may be up to 40% by total weight of the propellant charge or grain, such as up to 30%. Plasticisers may be present in an amount of 0-40% by total weight of the propellant charge or grain, such as 10-35%, of 15-30%. Antioxidants may be present in an amount of 0-7% by total weight of the propellant charge or grain, such as 0-5%. Bonding agents may be present in an amount of 0-7% by total weight of the propellant charge or grain, such as 0-5%. Burn rate modifiers may be present in an amount of 0-7% by total weight of the propellant charge or grain, such as 0-5%. Stabilisers may be present in an amount of 0-7% by total weight of the propellant charge or grain, such as 0-5%.

Suitably, at least one of the energetic materials can be dispersed as a solid material in a binder, such as in the form of small crystals. In an embodiment, all of the energetic materials are dispersed as a solid material in a binder.

The propellant charge or grain of the invention can have any desired shape. Typically useful shapes include a triangular prism or rounded triangular prism, a rectangular prism or rounded rectangular prism, a pentagonal prism or rounded pentagonal prism, a hexagonal prism or rounded hexagonal prism, an octagonal prism or rounded octagonal prism, a sphere, a spheroid, an ellipsoid, a cylinder, a rosette prism, a cube, a cuboid, a cone, a square-based pyramid, a rectangular-based pyramid, a pentagonal-based pyramid, a hexagonal-based pyramid, or an octagonal-based pyramid. Preferably, the propellant charge or grain is in the form of a hexagonal prism, a rosette prism, a sphere or a cylinder.

The propellant charge or grain of the invention is particularly useful for large calibre ammunition. Particularly for large calibre ammunition, impregnation techniques are unsuitable for preparing propellant charges or grains as the depth of impregnation is insufficient.

In a further aspect the invention is directed to a method for the preparation of a propellant charge or grain, comprising additive manufacturing of multiple layers to produce a layered propellant charge, wherein two or more of said layers each comprise at least one energetic material, wherein the linear burn rate of an energetic material in a first layer is different from the linear burn rate of an energetic material in a second layer, and wherein each of said layers has a layer thickness in the range of 1-10 000 μm, preferably 10-5000 μm, such as 50-2000 μm, 100-1000 μm, or 200-800 μm.

Such additive manufacturing suitably comprises layer by layer curing of liquid curable binder material. Hence, a layer of liquid curable binder material is cured to form a solid polymer layer, after which a new liquid layer of curable binder layer is cured to form a subsequent solid polymer layer that adheres to the previously cured solid polymer layer. By curing the layers imagewise and repeating such curing of layers multiple times, a three-dimensional object can be manufactured.

This technique allows manufacturing propellant charges or grains according to the invention with multiple linear burn rate gradients, by applying layers with different compositions.

Preferably, the one or more energetic materials are dispersed in the liquid curable or plastically deformable binder material. It may also be possible to use one or more liquid curable or plastically deformable energetic materials.

In a preferred embodiment, the liquid curable binder material is cured by radiation (such as ultraviolet or visible radiation) or thermally. More preferably, the liquid curable binder material is cured by ultraviolet radiation. Curing by ultraviolet radiation has the advantage of being more safe than thermal curing given the presence of energetic material.

Preferably, the method of the invention results in a propellant charge or grain according to the invention, wherein the two or more energetic materials are distributed within the charge or grain such that two perpendicular cross-sections of said propellant charge or grain each have at least two non-parallel linear burn rate gradients.

In yet a further aspect the invention is directed to the use of a propellant charge according to the invention in ballistics, pyromechnical devices (including actuators), fireworks or solid or hybrid propellant rockets.

The invention has been described by reference to various embodiments, compositions and methods. The skilled person understands that features of various embodiments, compositions and methods can be combined with each other. For instance, preferred coating compositions can be used in the various methods, in the same way preferred steps of a method can be combined with each other and with preferred coating compositions.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting examples.

EXAMPLES

Different pressure curves for a propellant charge or grain were simulated in order to achieve the ideal pressure curve using the following formula for dynamic vivacity, L.

$$L = \frac{dP/dt}{P \times P_{max}}$$

Figure 4:
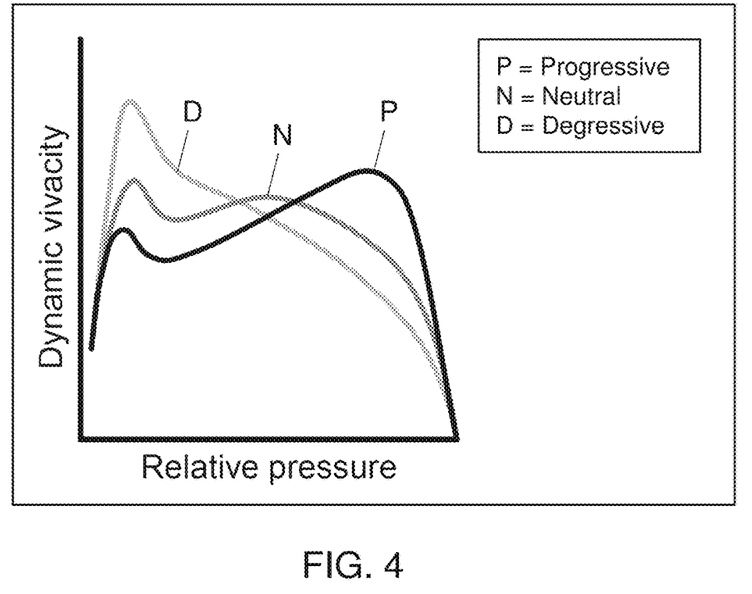
FIG. 4 illustrates three different pressure curves for a propellant charge or grain.

There are three different curves possible, a degressive curve where the dynamic vivacity decreases with increasing relative pressure, a neutral curve where the dynamic vivacity is more or less equal with increasing relative pressure, and a progressive curve where the dynamic vivacity increases with increasing relative pressure, as shown in FIG. 4. S low extension of the chamber volume after ignition requires a low initial combustion rate and thus points at a progressivity.

Figure 5:
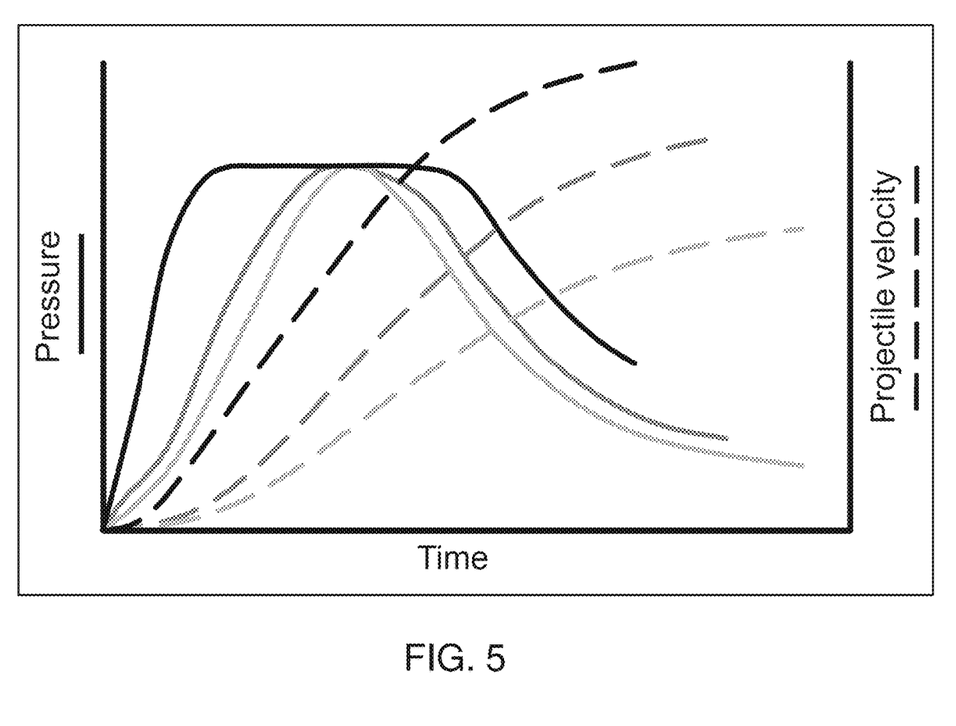
FIG. 5 illustrates the relationship between the relative pressure in the chamber over time and the projectile velocity over time.

FIG. 5 shows the relationship between the relative pressure in the chamber over time and the projectile velocity over time. As shown in this figure, the broader the pressure curve is, the higher the projectile velocity will be. Hence, ideally the pressure curve is a plateau curve, meaning that the pressure remains at a constant high level over an extended period of time.

Figure 6:
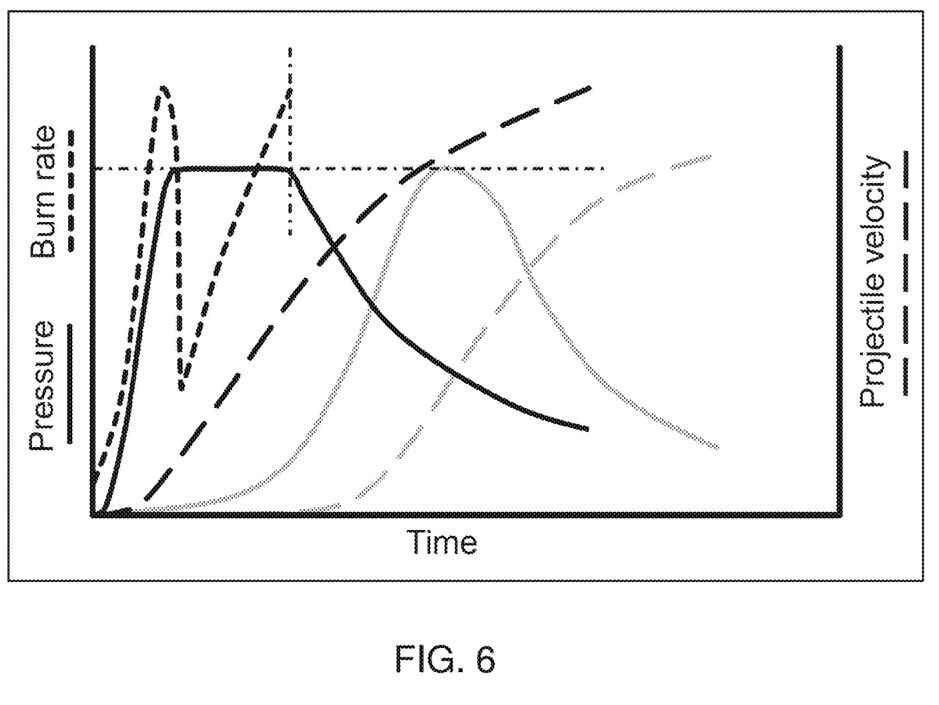
FIG. 6 illustrates a simulation with a medium size caliber (35 mm) and shows the burn rate that is required for the plateau pressure curve.

FIG. 6 shows a simulation with a medium size caliber (35 mm). Again the relationship between the relative pressure in the chamber over time and the projectile velocity over time is shown. However, FIG. 6 also shows the burn rate that is required for the plateau pressure curve. Initially, an increase in burn rate is required so as to raise the pressure to a maximum level, then a drop in burn rate results in the pressure becoming constant, after which a secondary increase in the burn rate is required for the pressure to remain constant.

The invention claimed is:

1. A propellant charge or grain, comprising two or more energetic materials with different linear burn rate, wherein the two or more energetic materials are layered as distinct, additive layer manufacturing print layers within the charge or grain such that two perpendicular cross-sections of said propellant charge or grain each have at least two linear burn rate gradients in non-parallel directions,
    wherein said layers have a layer thickness in the range of 1-10 000 µm, wherein, when the propellant charge or grain has a longitudinal axis that is longer than axes transverse thereto, at least one of said perpendicular cross-sections is along said longitudinal axis, and
    wherein said propellant charge or grain further comprises one or more perforations.

2. The propellant charge or grain of claim 1, wherein said propellant charge or grain further comprises two or more perforations.

3. The propellant charge or grain of claim 1, wherein the layers have a thickness in the range of 10-5000 µm.

4. The propellant charge or grain of claim 1, wherein the layers have a thickness in the range of 50-2000 µm.

5. The propellant charge or grain of claim 1, wherein the layers have a thickness in the range of 100-1000 µm.

6. The propellant charge or grain of claim 1, wherein the layers have a thickness in the range of 200-800 µm.

7. The propellant charge or grain of claim 1, wherein at least two linear burn rate gradients in each perpendicular cross-section are perpendicular to each other.

8. The propellant charge or grain of claim 1, wherein the charge or grain comprises three or more energetic materials with different linear burn rate.

9. The propellant charge of claim 1, wherein at least one of said linear burn rate gradients is such that the linear burn rate increases from the surface of the burn propellant charge or grain inwards.

10. The propellant charge of claim 1, wherein at least one of said linear burn rate gradients is such that the linear burn rate first decreases and then increases from the surface of the propellant charge or grain inwards.

11. The propellant charge or grain of claim 1, wherein said propellant charge or grain comprises 2-10 layers with different linear burn rate.

12. The propellant charge or grain of claim 1, wherein said propellant charge or grain comprises 2-8 layers with different linear burn rate.

13. The propellant charge or grain of claim 1, wherein said propellant charge or grain comprises 3-8 layers with different linear burn rate.

14. The propellant charge or grain of claim 1, wherein said propellant charge or grain comprises a binder, which binder may or may not be an energetic binder.

15. The propellant charge or grain of claim 14, wherein at least one of said energetic materials dispersed as a solid material in said binder.

16. The propellant charge or grain of claim 1 in the form of a triangular prism or rounded triangular prism, a rectangular prism or rounded rectangular prism, a pentagonal prism or rounded pentagonal prism, a hexagonal prism or rounded hexagonal prism, an octagonal prism or rounded octagonal prism, a sphere, a spheroid, an ellipsoid, a cylinder, a rosette, a cube, a cuboid, a cone, a square-based pyramid, a rectangular-based pyramid, a pentagonal-based pyramid, a hexagonal-based pyramid, or an octagonal-based pyramid.

17. The propellant charge or grain of claim 1, in the form of a rosette prism, a hexagonal prism, a sphere or a cylinder.

18. A method of preparing ballistics, pyrotechnics, fireworks or solid or hybrid propellant rockets, said method comprising incorporating the propellant charge or grain of claim 1 into said ballistics, pyrotechnics, fireworks or solid or hybrid propellant rockets.

* * * * *